United States Patent
Pearson et al.

(10) Patent No.: US 8,655,827 B2
(45) Date of Patent: Feb. 18, 2014

(54) QUESTIONNAIRE GENERATION

(75) Inventors: Siani Pearson, Lianvaches (GB); Tomas Sander, New York, NY (US); Prasad V. Rao, Metuchen, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1104 days.

(21) Appl. No.: 12/608,878

(22) Filed: Oct. 29, 2009

(65) Prior Publication Data

US 2011/0106731 A1 May 5, 2011

(51) Int. Cl.
*G06F 17/00* (2006.01)
*G06N 5/02* (2006.01)

(52) U.S. Cl.
USPC .......................................................... 706/48

(58) Field of Classification Search
USPC ............................................... 706/14, 48, 61
See application file for complete search history.

(56) References Cited

U.S. PATENT DOCUMENTS

| | | | | |
|---|---|---|---|---|
| 6,260,033 | B1 * | 7/2001 | Tatsuoka ........................... | 706/45 |
| 7,253,817 | B1 * | 8/2007 | Plantec et al. ................. | 345/473 |
| 2001/0052009 | A1 * | 12/2001 | Desai et al. .................... | 709/224 |
| 2002/0119433 | A1 * | 8/2002 | Callender ...................... | 434/322 |
| 2005/0132188 | A1 | 6/2005 | Khin et al. | |
| 2008/0028435 | A1 | 1/2008 | Strickland et al. | |
| 2008/0313110 | A1 * | 12/2008 | Kreamer et al. ................ | 706/12 |
| 2009/0150217 | A1 * | 6/2009 | Luff ................................ | 705/10 |

OTHER PUBLICATIONS

Pearson, S. et al. "Scalable, accountable privacy management for large organizations", 13th Enterprise Distributed Object Computing Conference Workshops (EDOCW 2009). Sep. 1-4, 2009, pp. 168-175.*
Andrews, A.K.A. et al. "AI planner assisted test generation." Software Quality Journal, vol. 10, No. 3 pp. 225-259. 2002. DOI: 10.1023/A:1021686406575.*
Wang, H. et al. "Computer Assisted Language Learning system based on dynamic question generation and error prediction for automatic speech recognition." Speech Communication, vol. 51, No. 10, pp. 995-1005. Oct. 2009. DOI: 10.1016/j.specom.2009.03.006.*
Bowen, James et al., "Question-Generation in Constraint-Based Expert Systems", Technical Report, CS Dept., UCC, Cork, Ireland (2002) pp. 1-15.
Hyafil, Laurent et al., "Constructing Optimal Binary Decision Trees is NP-Complete" Information Processing Letters, vol. 5, No. 1 (May 1976) pp. 15-17.
Lee, Gun Ho, "Rule-based and case-based reasoning approach for internal audit of bank" Knowledge-Based Systems 21 (2008) pp. 140-147.
McGough, Jeff et al., "A Web-based testing system with dynamic question generation" 31st ASEE/IEEE Frontiers in Education Conference, Reno, Nevada (2001) pp. S3C 23-S3C 28.

* cited by examiner

*Primary Examiner* — Jeffrey A Gaffin
*Assistant Examiner* — Benjamin Buss

(57) ABSTRACT

A questionnaire generation process presents a first subset from a set of questions of the questionnaire and receives first answers from a user. The first answers are used to determine whether the first answers are sufficient to give definite values to conditions of first rules, wherein the first rules have conditions for providing output. When the first answers are not sufficient, the conditions of the first rules can be used to identify a second subset of the questions, wherein the second subset of questions has second answers such that a combination of the first and second answers is sufficient to give definite values to the respective conditions of the first rules, and the second subset of questions can be presented to the user.

15 Claims, 4 Drawing Sheets

QUESTIONNAIRE GENERATION

BACKGROUND

Expert systems and techniques for building expert systems are well known and described in text books such as S. Russel and P. Norvig, "Artificial Intelligence—A Modern Approach," 2nd edition, Prentice Hall (2003). In general, an expert system is a computer implemented system that attempts to provide the knowledge and the responses of a human expert for at least a specific problem. Expert systems can encode knowledge or inference rules in data structures rather than in program code. A key advantage of this approach is that an expert can author a knowledgebase or inference rules and can understand or modify statements relating to their expertise without having strong programming abilities.

Decision support systems are similarly known computer implemented advisor systems but specifically attempt to support decision making activities. The concept of decision support can be very broad. A decision support system may refer to a type of expert system that provides relevant information, advice, or other support of a decision making process. For example, a decision support system can search for, collect, and provide data that is relevant to a decision that a user is considering. A decision support system may include a questionnaire to identify the context of the decision being made, so that the relevant advice or data may be provided.

Conventional expert and decision support systems commonly use decision trees or decision tables to represent a questionnaire that must be traversed to arrive at a final result. However, the logic involved in such a questionnaire can be more complex than a simple tree structure can easily represent. For example, representing the complex context needed for evaluation of privacy best practice and regulations with a tree structure can quickly run into problems because of the large number of possible answers, the need to duplicate the same information in many places within the tree, the huge size of resultant trees, the common need to perform additional computation outside the decision tree, and the need to conjoin output and not just stop once an output could be given. These issues can make authoring of the questionnaire for such a system difficult. Further, some systems must test for several independent contexts, and results are generated and output according to each of the independent contexts. For these systems, the decision tree approach could necessitate defining one decision tree for each context and testing the outcome of all the decision trees created.

Another issue for advisor systems is completeness. In particular, all possible combinations of answers from a questionnaire must provide respective contexts for which a corresponding knowledgebase can provide an unambiguous answer or other output. However, many expert systems, decision support systems, and advisor systems generally are too complex to allow for provable completeness using conventional architectures because of the large number of combinations of answers. As a result, it is difficult for an expert or system builder to know whether a system is complete and asks all necessary questions or has all the necessary answers at every leaf node of every decision tree required in a system.

BRIEF DESCRIPTION OF THE DRAWINGS

Use of the same reference symbols in different figures indicates similar or identical items.

DETAILED DESCRIPTION

In accordance with an aspect of the invention, advisor systems and processes can provide questionnaire generation in an adaptive manner so that the answers given efficiently select additional questions presented to a user. Further, questionnaire generation can be based on a rule set that is implemented using the same rules engine or inference engine that implements output generation from a knowledgebase. The rules for questionnaire generation dictate relationships among a user's answers to prior questions, intermediate variables, and further questions to be shown to the user. These relationships of the prior answers, intermediate variables, and the further questions can be modeled using a tripartite graph, which may be simpler to construct and manipulate than are tree structures conventionally employed for questionnaires. Accordingly, questions can be presented to a user not based on a decision tree, but instead based on rules having conditions that are or depend on the intermediate variables.

In accordance with a further aspect of the invention, the completeness of a questionnaire can be automatically evaluated based on rules for output generation, which define a knowledgebase. More specifically, a human author can organize a questionnaire in a manner that is intuitive or natural for a user answering the questions, but the task of determining whether the questionnaire is complete, i.e., presents all necessary questions for all possible combinations of answers, can be complex. In accordance with an aspect of the invention, after an authored part of a questionnaire has run, intermediate variables set according to answers to questions in the questionnaire can be evaluated for completeness. In particular, the conditions in rules that control the output or advice from an advisor system can be evaluated to determine whether the answers from the questionnaire so far has provided all of the input necessary to unambiguously select the output or advice provided to a user. If the completeness evaluation finds that one or more undefined intermediate variables are required for selection of the advice or other output from a knowledgebase, a rules or inference engine can identify questions that must be answered to set the values of the required intermediate variables. The rules engine then presents these questions to the user. Thus, a questionnaire can have the advantage of a structure that is intuitive or natural as created by human author or expert combined with an automatic assurance of completeness that comes from a failsafe that later corrects possible errors and omissions in the questionnaire.

Figure 1:
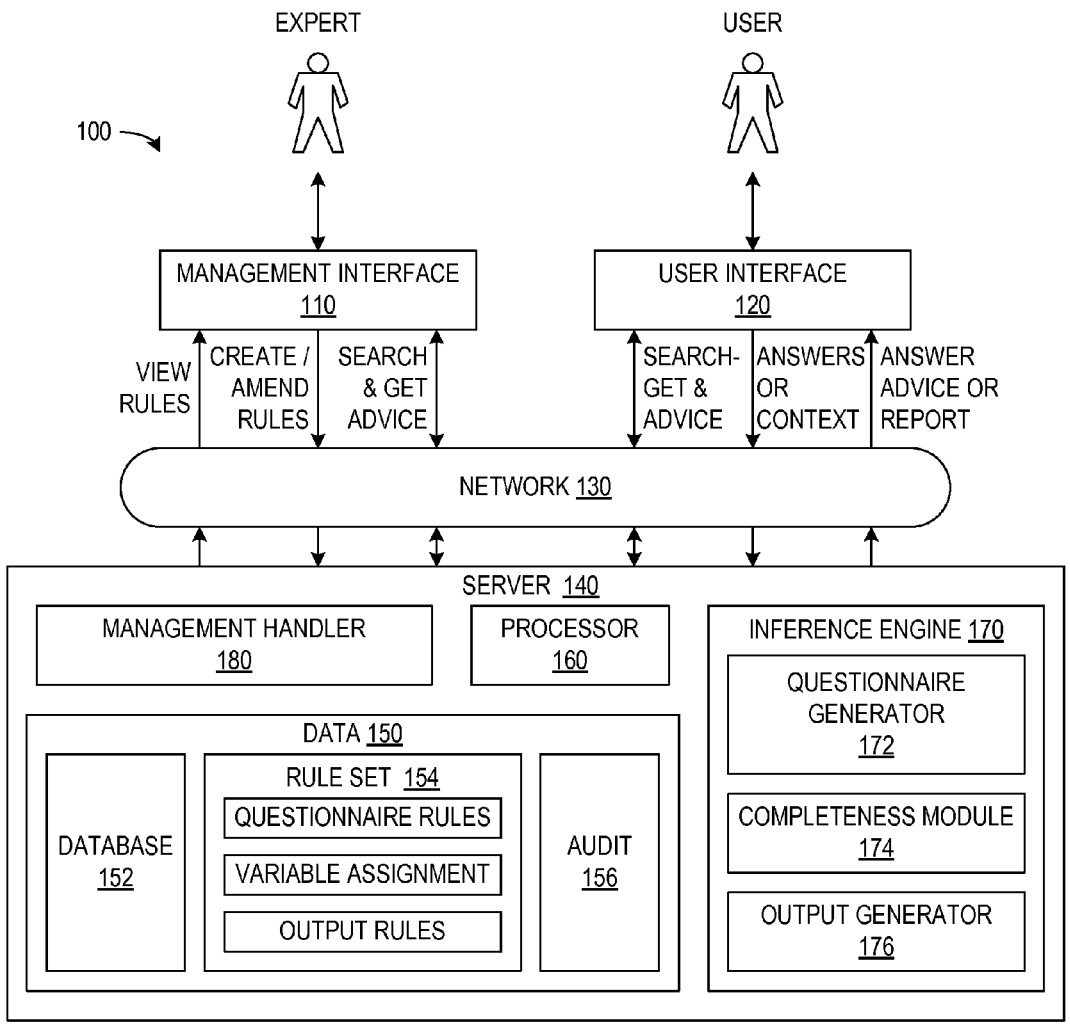
FIG. 1 is a block diagram illustrating the general architecture of an advisor system in accordance with an exemplary embodiment of the invention.

FIG. 1 illustrates an exemplary architecture of an advisor system 100 in accordance with an embodiment of the invention. Advisor system 100 may be an expert system, a decision support system, or any other system that queries a user and provides information selected according to the user's answers to questions. In an exemplary embodiment, which is described herein to provide a concrete illustration, advisor system 100 provides advice, information, or reasoning concerning privacy laws, regulations, and best practices. In the exemplary embodiment, advisor system 100 may be employed within an enterprise that possesses private information of customers or others and may employ users in many different jurisdictions that may need to make decisions regarding the handling of the private information. Accordingly, in the exemplary embodiment, the output provided will depend on a context that includes information such as the type of private information that may be at issue, the relationship of the party possessing the private information and the party having a privacy right, the jurisdiction or jurisdictions in which the privacy issues are raised, and whether the information will cross jurisdiction borders. Since laws and circumstances where privacy issues can arise vary greatly, it is important to have a questionnaire that efficiently obtains all necessary information before advisor system 100 provides advice.

Advisor system 100 as shown in FIG. 1 includes a management interface 110 and a user interface 120 that are connected through a network 130 to a server or other computing system 140.

Management interface 110 generally includes a computing system that an expert or system manager operates. The expert may be the author or manager of a rule set 154 that advisor system 100 uses. In particular, management interface 110 may include a personal computer, a digital assistant, a smart phone, or other electronic device that is connected to network 130 and capable of running a browser or other software that presents management options to the expert and conveys instructions from the expert to the rest of advisor system 100. Typically, the management options would be provided through a graphical user interface (GUI) and would include the abilities to view, amend, create, or delete rules in rule set 154. Management interface 110 may also provide all of the options available to an ordinary user such as the ability to operate advisor system 100 to search a knowledgebase or get advice. Although FIG. 1 shows single management interface 110 in advisor system 100, multiple experts that may be geographically located in the same room or spread throughout the world may be able to access advisor system 100. Management handler 110 may partially implement a concurrency control system or a version control system when multiple experts are permitted to simultaneously edit data structure 150, but such systems can also be implemented in a management handler as described further below.

User interface 120 similarly includes a computing system but is operated by a user seeking advice or information from advisor system 100. User interface 120 may include a personal computer, a digital assistant, a smart phone, or other electronic device that is connected to network 130 and capable of running a browser or other software that presents control options, questions, and results to the user. Through user interface 120, the user would typically be able to access functions of advisor system 100 such as searching for information, providing answers or context that identify the advice or information that the user seeks, and getting the desired advice or information from system 100. Although FIG. 1 shows a single user interface 120 in advisor system 100, in a more typical implementation, multiple users that may be geographically located in the same room or spread throughout the world may be able to access advisor system 100.

Network 130 may be a local area network, a wide area network, the Internet, or any suitable system for connecting the computing systems associated with management interface 110 and user interface 120 to server 140. In an alternative embodiment to that illustrated in FIG. 1, management interface 110 or user interface 120 may be implemented on server 140, so that a connection through network 130 is not required for interface 110 or 120. For example, management interface 110, user interface 120, and the functions of server 140 may be implemented on a standalone computing system so that network 130 is not required.

Server 140 in the embodiment of FIG. 1 is a computing system that includes data storage 150 and a processor 160. Data storage 150 contains a database 152 of intermediate variable and information relevant to the subject matter of advisor system 100, rule set 154 for advisor system 100, and audit information 156 that may log or record modifications or use of advisor system 100. Server 140 also stores code that processor 160 executes to implement the processes of an inference engine 170 and a management handler 180.

Inference engine 170 is a rules engine arranged to implement a question generator 172, a completeness module 174, and an output generator 176 as described further below. Inference engine 170 can employ a commercially available or open source rules engine such as Drools, GENSYM, Fair Isaac Blaze Advisor, iRules, or JESS. As described further below, questionnaire generator 172 uses rule set 154 and the values of intermediate variables in database 152 to identify questions to be presented to a user, e.g., through a servlet that dynamically generates web pages that are presented to the user through user interface 120. Completeness module 174 is triggered to check whether the answers or the values of intermediate variables obtained through prior execution of questionnaire generator 172 are complete and allow selection of output according to rule set 154. Completeness module 174 presents additional questions if necessary when the values of intermediate variables in database 152 are not complete. Once all the necessary answers have been obtained, output generator 176 uses rule set 154 and the values of the intermediate variables in database 152 to determine which advice, results, or other information to output or present to the user.

Inference engine 170 with question generator 172, completeness module 174, and output generator 176 enhances the model-view-controller (MVC) architecture of enterprise systems. (MVC architecture is generally a standard pattern used to achieve separation of data access code, business logic, and presentation code from one another.) An expert using management interface 110 can control behavior of inference engine 170 by editing rule set 154, which contains metadata representing the questionnaire and output rules. System 100 when used to develop an advisor system can reduce development time normally required to address the issue of completeness since completeness module 174 automatically checks rule set 154 for completeness.

Management handler 180 includes a set of server components that help the expert when editing database 152 or rules set 154. Management handler 180 may, for example, include subcomponents such as a listing component to list, sort, or filter the knowledgebase objects like questions and rules, an analysis component that analyzes the impact of changing a question or rule and that lists the questions that will need to be modified or removed from system 100 as part of the impact of the change, and an editing component that may implement a set of validations that are performed on the knowledgebase objects. As described further below, questionnaires can be organized and edited using the intermediate variables and expressions thereof to define conditions of rules indicating when questions are presented. For editing of such rules, an author can use management handler 180 to search for expressions or intermediate variables. For example, the expert can display all the expressions that contain an intermediate variable indicating whether data flow crosses an international border. Management handler 180 may also implement a concurrency control system and a version control system to avoid corruption by interference when multiple experts use system 100. Concurrency control systems and version control systems are generally known in computing environments that permit multiple users (experts in this case) to simultaneously edit data structures.

To add a question to a questionnaire, the expert can simply add to rule set 154 a questionnaire rule indicating a context or condition upon which the question will be presented. For example, if an expert wants a new question to be presented whenever there is trans-border data flow, the expert only needs to add one new rule with a condition that the intermediate variable corresponding to trans-border data flow is set. Full analysis of all conditions in which the question may arise in the questionnaire is not needed. The question will be automatically added if appropriate. Further, advisor system 100 limits each question so that each question can be asked only once, so that no harm results if the expert creates a duplicate rule for presenting the question.

Rule set 154 generally includes the questionnaire rules that identify questions for presentation, variable assignment rules for assigning values to intermediate variables according to user answers, and output rules that identify results to be provided based on the answers to questions. In a typical embodiment, a questionnaire rule is a data structure that includes or links a condition and a list containing one or more questions to be presented to a user when the condition has specific values and the questions have not already been asked. The output rules are similar data structures that can define a knowledgebase for advisor system 100, and in a typical embodiment, an output rule has a corresponding condition and identifies output that would be presented to the user during report generation when the corresponding condition has a specific value or values. Each condition used in the questionnaire or output rules may be an intermediate variable or may depend on intermediate variables that may be assigned values according to a user's answers to the questions previously presented and the rules for assigning values to intermediate variables. As described further below, questionnaire generator 172 uses questionnaire rules during questionnaire generation and completeness module 174 may use output rules for further questionnaire generation. Output generator 176 uses output rules during report production. Accordingly, advisor system 100 provides both questionnaire generation and output selection within the same rule engine framework. These techniques being rules-based can be adaptive, e.g., to dynamically present sets of questions based on the users' answers and rule set 154, while output generator 176 similarly produces an actionable report based on the users' answers and rule set 154.

Figure 2:
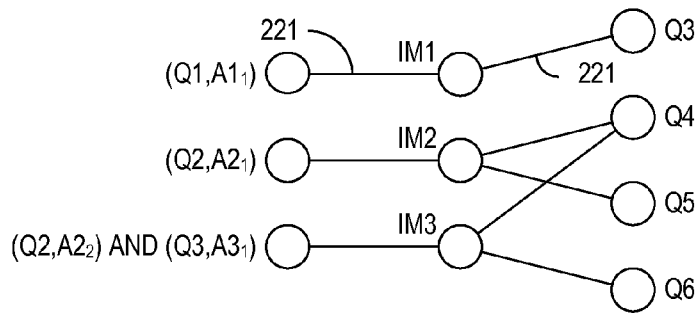
FIG. 2 shows an example of a tripartite graph representing rules used in questionnaire generation in accordance with an embodiment of the invention.

FIG. 2 shows a tripartite graph illustrating an oversimplified example of rules relating questions-answer pairs, intermediate variables, and questions. A tripartite graph generally represents a set of linked elements or nodes that is partitioned into three parts such that no two nodes in a part are linked to or "adjacent to" another node in that part. Lines connecting two nodes in FIG. 2 indicate that the nodes are linked or related by a rule. The tripartite graph of FIG. 2 corresponds to the firing of several rules in a chain. Some of the rules connect the answers or user input to intermediate variables, flags, or conditions, and others rules connect the intermediate variables, flags, or conditions to the questions to be asked.

The middle column of nodes in FIG. 2 corresponds to semantically meaningful abstract statements or conditions. Each condition logically corresponds to a statement such as a statement that "the project involves personal information," "the project involves treatment of sensitive data," or "the project involves data flow between countries." Each condition has a Boolean value, TRUE or FALSE, when the corresponding statement is found to be true or false and has an undefined value when the condition cannot be set based on answers so far provided to a questionnaire. In the illustrated embodiment, the conditions are intermediate variables IM1, IM2, and IM3. More generally, intermediate variables can have Boolean, numeric, or other types of values, and the conditions depend on the values of the intermediate variables: For example, an intermediate variable may have an accumulated value based on previously provided answers. In particular, an intermediate variable IM could represent a risk value, which is a numerical measure of risk and is computed based upon the answers given so far by the user. An example of such a risk value is a count of the "yellow flags raised." A condition dependent on a risk variable could then be of an expression of the form IM$\geq$3, for a questionnaire rule that causes presentation of a question such as "Has your project been reviewed by the legal department?" when there are at least three yellow flags that have been identified through prior questions.

The nodes in left column of FIG. 2 represent monotonic expressions generally involving (question, answer) pairs that are used for assigning the values to respective intermediate variables IM1, IM2, and IM3 upon which the conditions in the center column depend. For example, a Boolean intermediate variable IM can be set according to a rule of the form "IF Exp THEN set IM," where Exp is a monotonic expression, e.g., an expression built up using logical operators AND and OR, one or more question-answer pairs, or other intermediate variables. The rules specifically represented by the first two columns in FIG. 2 can indicate the condition corresponding to intermediate variable IM1 is assigned value TRUE when the answer to a question Q1 is the answer $A1_1$. Similarly, when the answer to question Q2 is $A2_1$, intermediate variable IM2 is set to TRUE, and when the answer to question Q2 is $A2_2$ and the answer to question Q3 is $A3_1$, intermediate variable IM3 is set to TRUE.

Monotonic expressions are used to ensure a predictable and deterministic results: In particular, an expression once set from an undefined value to a defined value cannot be changed, except through a controlled process as described further below when a user changes a previously given answer. Expressions involving only Boolean variables and logical operators such as AND and OR are monotonic because once the set of the Boolean variables that have assigned values is sufficient for determination of the value of the expression, setting of further Boolean variables cannot change the value of the expression. Similarly, an expression involving ordered variables can be formulated to be monotonic so that once the expression is true, the expression can never become false. For instance, an expression of the form "IM>3" may be permitted (and is monotonic) if the value of variable IM can only be increased, but an expression "IM<3" is not permitted if subsequent answers could increase the value of variable IM.

The setting of values of the intermediate variables are not required to be directly based on the answers for questions but may alternatively be set through the operation of rules that are not directly related to questionnaire answers. In general, code (e.g., Java™ code) can be activated based on any type of rule to run a procedure using input including the previously given answers. For example, a rule for setting the value of an intermediate variable like "project is complex" may activate Java™ code that would run a simulation of output based on a scenario determined by the previously given answers and the output of the simulation could be used to determine whether the project is complex. When the context is determined to be complex, additional questions can be presented and answered.

The right column in FIG. 2 represents questions Q3, Q4, Q5, and Q6 that are related to the conditions respectively depending on intermediate variables IM1, IM2, and IM3. The links to the right column generally correspond to questionnaire rules of the form "IF Exp2 THEN addQuestions," where Exp2 is the condition and typically depends on one or more intermediate variables. In general, the expression Exp2 is a monotonic expression built up from one or more intermediate variables and addQuestions indicates a question or questions to be presented. Optionally, the questionnaire rules or the data structure of a question can additionally define how the questions will be displayed, e.g., whether in a depth-first or breadth-first manner, and whether the questions will be presented to the user immediately or over time. In the specific case of FIG. 2, the rules simply indicate that question Q3 is presented to the user when intermediate variable IM1 is TRUE, questions Q4 and Q5 are presented to the user when intermediate variable IM2 is TRUE, and questions Q4 and Q6 are presented to the user when intermediate variable IM3 is TRUE. More specifically, questionnaire generator 172 can be adapted to add a question to a list for presentation and only add the question if the question is not already in the list.

Figure 3:
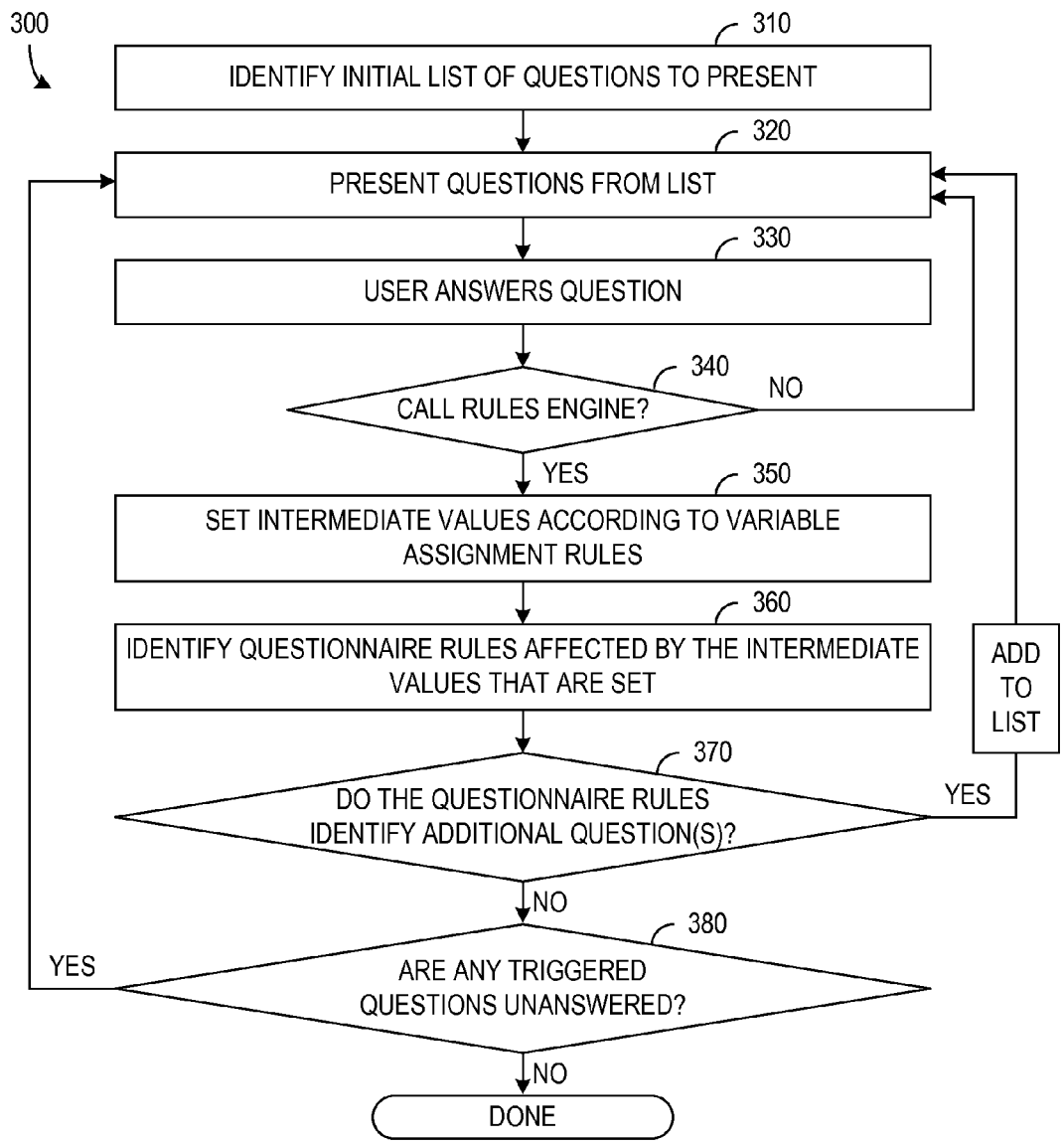
FIG. 3 is a flow diagram of a rules-based questionnaire process for an advisor system in accordance with an embodiment of the invention.

FIG. 3 is a flow diagram of a process 300 in which inference engine 170 (or questionnaire generator 172) when operating on a rule set can generate at least a portion of a questionnaire. In an initial step 310, a set of one or more introductory or initial questions to be presented to a user are identified. The identified questions may be put into a list or organized into multiple lists. In step 320, identified questions from the list or lists are presented to a user, e.g., on a web page that is generated and sent for display using the user's browser. One type of question may permit only a yes or no answer (e.g., that are input using a radio button that step 320 provides.) For other questions, step 320 may provide for three or more choices or even text entry. Step 320 optionally can delay presentation of some questions in a presentation list. For example, a first question from a list of questions may be presented during a first execution of step 320, and a next question from the list may be presented after a previous question is answered regardless of the answer provided to the previous question or questions. (In particular, a single questionnaire rule may begin sequential presentation of multiple questions.) For the rules represented in FIG. 2, presentation step 320 may initially present questions Q1 and Q2 to the user either simultaneously or sequentially.

The user provides an answer in step 330 to one of the presented question or questions. For the example of FIG. 2, the user may answer question Q1 with either answer $A1_1$ or $A1_2$. More generally, each question can have two or more acceptable answers as noted above.

Step 340 is a decision step determining whether or not to call the rules engine (e.g., inference engine 170 or questionnaire generator 172) when a user provides an answer. There are several alternative approaches that can be employed for determining when to call the rules engine for evaluation of questionnaire rules. In particular, question generator 172 could be run after each time the user answers a question. Alternatively, for a block of questions, inference engine 170 can run at certain specified points using the input that has been collected up to that point, so that the new set of questions are presented only at the specified points in the process. Another approach that can be implemented in decision step 340 is to only run the rules engine to evaluate questionnaire rules at every question that causes a bifurcation of questions, i.e., whenever there is a decision to be made regarding whether questions will be presented. If it is not time to call the rules engine, process 300 branches back to step 320 and either presents the same set of questions or adds one or more new questions from an identified list of sequentially presented questions. Process 300 branches to step 350 when it is time to call the rules engine.

The rules engine in step 350 uses the available answers, previously set values of intermediate variables, and variable assignment rules to set values of intermediate variables. The rules engine in step 360 then determines whether any questionnaire rules have conditions that depend on the set values of the intermediate variables and in decision step 370 evaluates the condition expressions for those questionnaire rules to whether the questionnaire rules identify any additional questions to be presented to the user. For example, with the rules represented in FIG. 2, answer $A1_1$ to question Q1 causes questionnaire generator 172 to set intermediate variable IM1 to true per variable assignment rule 211, identify a questionnaire rule 221 as being dependent upon variable IM1, and identify that question Q3 should be present in accordance with rule 221 when intermediate variable IM1 has value TRUE. Similarly, answer $A2_1$ to question Q2 of FIG. 2 causes questionnaire generator 172 to set intermediate variable IM2 to TRUE and identify questions Q4 and Q5 for presentation. When decision step 370 identifies new questions to be presented, process 300 branches from step 370 to step 320 and presents questions including the newly identified questions to the user. The author of the questionnaire rules or the questions can assign an order or priority for presentation of questions or blocks of questions to give the questions presented in step 320 a logical order when multiple questionnaire rules trigger the presentation of questions.

The presentation of prior and new questions to the user in step 320 can employ a variety of techniques for arranging and presenting questions. For example, step 320 may only present the identified questions that are unanswered. Alternatively, all or a selected set of identified questions whether answered or unanswered can be presented to the user with or without permitting the user to alter previous answers. When answers are changed, reevaluation of the identified questions in the questionnaire may be required as described further below.

In a variant of question presentation in step 320, the data structure corresponding to questions may include presentation parameters that determine where a question is presented relative to other questions. For example, if the rule engine based on the newly received input/answer to a current question C determines that a new question Q should be added to the questionnaire, the rules engine can examine the presentation parameters to determine a location for the new question within the presentation. For example, the new question Q can be added immediately after the current question C within a list of questions presented or at the top, bottom, or elsewhere within the list of presented questions, if a presentation parameter of question Q indicates "Depth First," "Breath First," or no preference for ordering of questions. In this way, the presentation parameters allow implementation of drill down scenarios where the answer to a question C requires for usability reasons that the follow up question Q be asked immediately afterwards.

Presentation step 320 can also handle several lists of questions and a presentation parameter of a question can indicate a list to which the question is added. In this way, an intuitive grouping of questions into sections can be presented. Sections or blocks of questions may be thematically organized, titled, and shown to the user in an author specified sequence or arrangement. This supports usability in that questions in the presentation can provide the user with a clear mental model of a section logical flow or progress, e.g., if a section is presented with a progress bar. If, for example, the rule engine determines that questions Q and Q' should be added where question Q is related to trans-border data flows and question Q' is related to encryption measures, question Q may be added to a list containing data flow related questions, and Q' may be added to a list containing security related questions.

Steps 320 through 370 will generally be repeated several times as the user provides answers to the additional questions identified for presentation. For example, the answer to question Q3 when combined with the answer to question Q2 can lead to the presentation questions Q4 and Q6 in a repetition of steps 320 to 370 in a process having rules corresponding to the tripartite graph of FIG. 2.

When step 370 determines that the current values of intermediate variables do not indicate additional questions to be presented, process 300 branches to step 380 and determines whether all presented questions have been answered. If there are unanswered questions, process 300 branches back to step 320. When all presented questions have been answered and there are no presented questions that are unanswered, process 300 is complete. When process 300 is complete, there may be questions that have not been presented and answered and some intermediate variables may have undefined values. For example, with the rules of FIG. 2, question Q6 will not be presented if a user answers $A1_2$ to question Q1, and any intermediate variables (not shown) that depend on the answer to question Q6 will not have defined values. Ideally, an expert will design the questionnaire rules to avoid presentation of questions having answers that are irrelevant in view of the answers to other questions. The questionnaire generation is thus adaptive to avoid asking unnecessary questions. As described further below, the questionnaire generation can also be used with automatic completeness checking to ensure that all necessary questions have been answered.

An expert can use a tripartite graph structure (or a rule set corresponding to a tripartite graph) to define a desired questionnaire. This may provide advantages over conventional tree structured questionnaires by reducing the number of multiple and possibly duplicated tree structures needed to define a complex questionnaire. Further, a tripartite graph structure such as shown in FIG. 2 can be easily converted into or contained in a rule set for an inference engine.

The rule set 154 of FIG. 1 includes output rules in addition to the questionnaire rules that may be represented in a tripartite graph. An output rule identifies the output that advisor system 100 provides to a user in a particular context. As mentioned above, an output rule generally contains a condition that corresponds to the context or contexts in which the output rule applies. An expert when authoring rule set 154 might first define output rules according to the subject matter represented in database 152. For example, if advisor system 100 contains a knowledge base of laws, regulations, and best practices for handling the private information of others, an expert may start by converting the relevant laws, regulations, and best practice rules into output rules that the rules engine can interpret. Statements used in the laws, regulations, or best practices rules can be assigned to intermediate variables that are used in the conditions of these output rules. The questionnaire rules can then be constructed to identify the law or output rule that applies. For example, if the rule depends on an action or a party being in a particular state or country, one or more intermediate variables can identify the state or country. For each intermediate variable used in the conditions of the output rules, the author of rule set 154 should include a question or questions that when answered provide a value for that intermediate variable.

The author of rule set 154 can then attempt to provide questionnaire rules that provide a logical order for presentation of questions to the user. For example, the questionnaire rules can be used to order the questions logically, for example, by providing drill-down where more detailed follow-on questions are presented to refine a previous answer. Such techniques can greatly enhance the user friendliness of advisor system 100 to the user. As noted herein, completeness module 174 can also reduce the burden on the author because completeness module 174 can complete the presentation of a questionnaire if operation of the questionnaire rules fails, on some occasions, to provide the complete context required for output generation.

Figure 4:
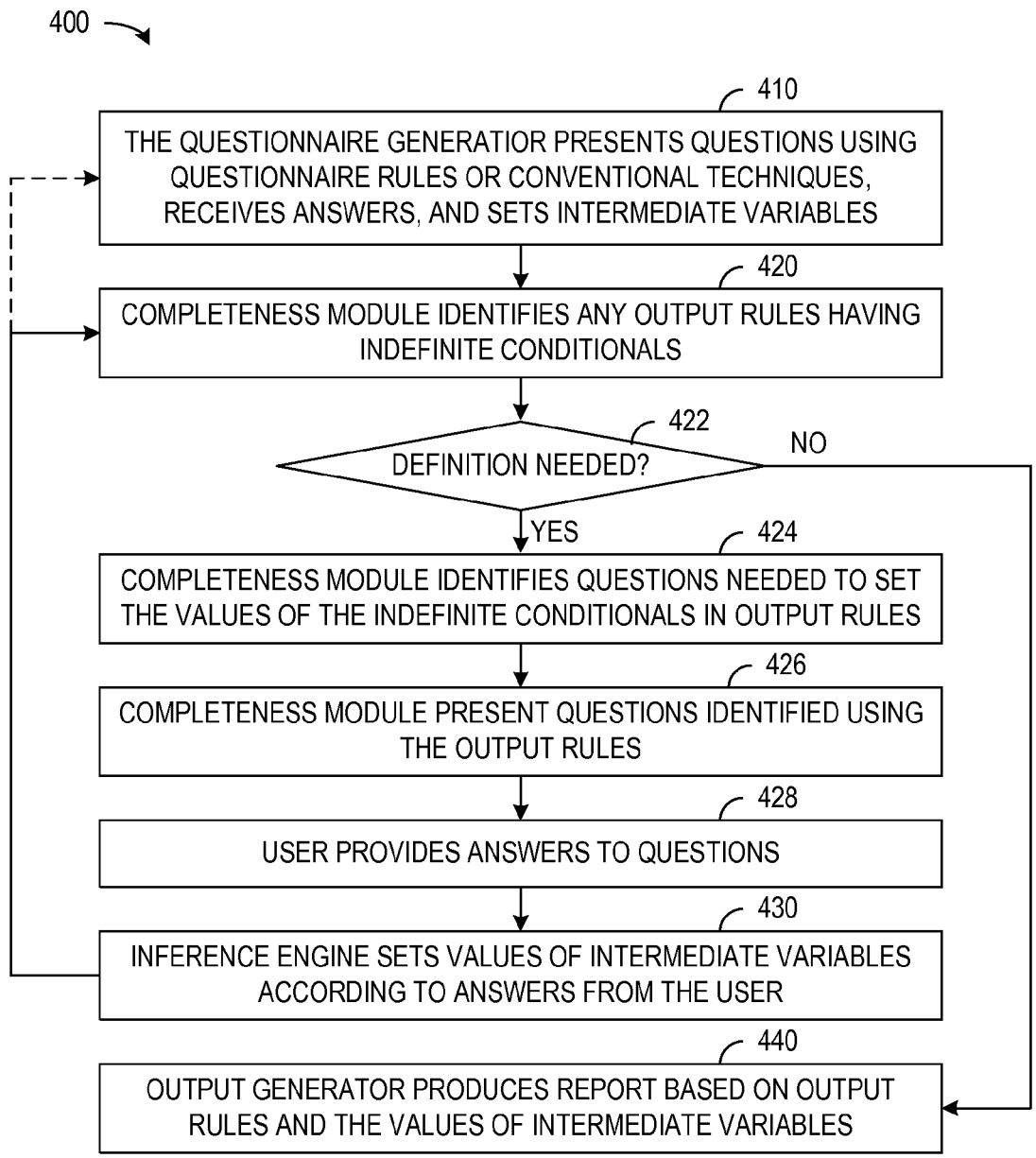
FIG. 4 is a flow diagram for an advisor system using an automated completeness checking process in accordance with an embodiment of the invention.

FIG. 4 is a flow diagram of a process 400 for use of an advisor system such as advisor system 100 of FIG. 1 with automated completeness checking and is described with reference to the elements illustrated in FIG. 1. Process 400 begins with a step 410 of presenting a questionnaire, receiving answers, and setting intermediate variables. The questionnaire presented in step 410 may be generated based on questionnaire rules, for example, as described with reference to FIG. 3. This portion of the questionnaire can alternatively be generated using conventional techniques, such as questionnaires defined by tree structures. In general, step 410 would typically (but is not required to) involve questionnaire generation based on a structure created by an expert. The answers to this portion of the questionnaire would be used to set values of intermediate variables used in the output rules in rules set 154. However, in general, the answers to a questionnaire may not provide values for all intermediate variables. The questionnaire process of step 410 fails to be complete if any of the intermediate variables that are needed to unambiguously provide output have undefined values.

Completeness module 174 in step 420 determines whether any additional questions need to be asked for completeness after questionnaire step 410. In general, one or more further questions need to be presented to a user if any output rules in rule set 154 have a condition with an undefined value. A condition may have an undefined value when no value has been assigned to an intermediate variable used in the condition. However, in many cases, not all intermediate variables used in a condition need to have assigned values because of the specific values of other intermediate variables. For example, a condition of the form (A OR B) has a definite value TRUE whenever variable A has the value TRUE, regardless of whether or not variable B is TRUE, FALSE, or does not have an assigned value.

Process 400 branches from a decision step 422 to a step 424 if completeness module 174 finds an output rule with an undefined condition. In step 424, completeness module 174 identifies the question or questions that correspond to intermediate variable or variables that do not have assigned values but are required to define the value of a condition in an output rule. In one embodiment of the invention, a variable assignment rule links a question-answer expression to each intermediate variable, and the question-answer expression is linked to a question and indicates how the value of the intermediate variable depends on particular answers of the linked question. Once the relevant question or questions are identified, completeness module 174 in step 426 presents the questions, and the user provides answers in step 428. Although the presentation of questions in step 426 is not strictly according to an authored plan of presentation, the author of the questions can assign a general order or priority to the questions.

Step 426 can present the questions according to that assigned order or priority, so that the user answering the questions can see relationships of the questions. Step 430 then sets the values of intermediate variables according to the answers. In illustrated embodiment, process 400 can then branch back to step 420, where completeness module 174 attempts to identify any further output rules that may have undefined conditions. (Alternatively, process 400 could branch back to step 410 and reactivate the authored portion of the questionnaire in view of the new values assigned to intermediate variables.) If step 420 determines all of the conditions for the output rules have defined values, output generator 176 in step 440 can unambiguously provide the advice or other output information identified by the output rule or rules that correspond to the context identified by the user's answers.

Figure 5:
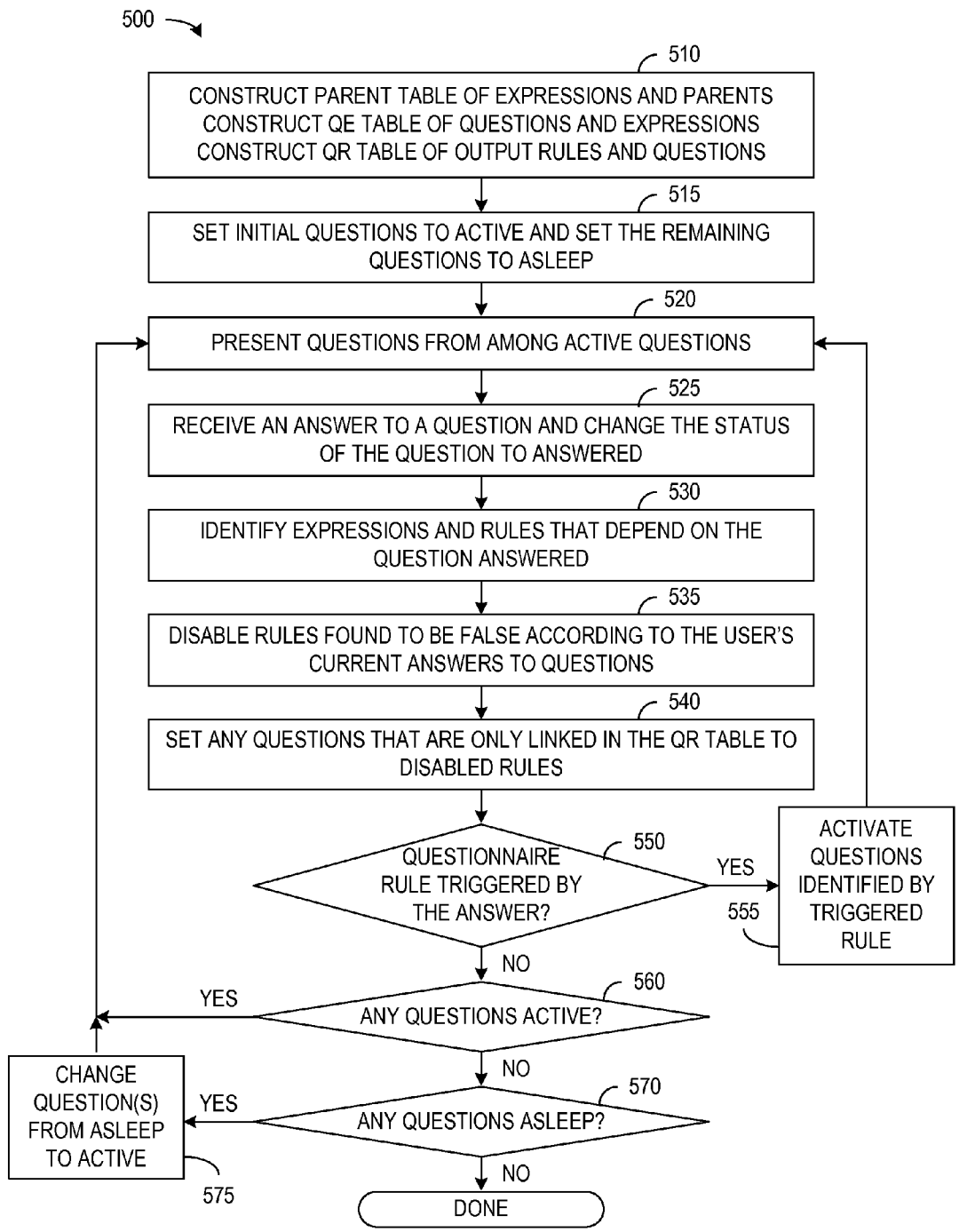
FIG. 5 is a flow diagram for an advisor system generating a questionnaire with questionnaire rules and completeness checking in accordance with an embodiment of the invention.

The processes of FIGS. 3 and 4 illustrate how completeness checking and the authored questionnaire generation based on questionnaire rules can be independently employed. However, the processes for rules-based questionnaire generation and completeness checking can more generally be linked. FIG. 5, for example, illustrates a process 500 that performs at least part of the completeness checking process while presenting an authored questionnaire. Inputs to process 500 include the set R of output rules, the set Q of questions, and the set A of the possible answers to the questions Q. Step 510 of process 500 performs preprocessing of these inputs to generate a "parent" table and a question-expression (QE) table.

The parent table in an exemplary embodiment is a two column table containing ID numbers of Boolean expressions paired with the respective ID numbers of parents that contain the expressions. In general, a parent is another expression, and the parent table can include for each expression a chain of expression-parent pairs leading to a root expression that is the condition of an output rule. The condition of a rule can be assigned an ID number corresponding to the rule. Each expression contained in a root condition can be assigned an ID number based on the ID number of the root condition and the position of the expression in a standardized hierarchical decomposition of the root condition. In general, each expression either has a Boolean value that directly depends on an answer to a question or contains a set of subexpressions linked by logical operators such as OR operators or only AND operators. An expression that directly depends on an answer can be assigned a value based solely on the answer given to the question, and any condition can be expressed (or reformulated) as expressions that depend directly on answers and only OR and AND operators.

The QE table is a two column table. One column contains question ID numbers, and the other column contains the ID numbers of expressions that respectively depend on the answers of the paired questions. As described further below, the QE table enables navigation from a question to the expression or expressions that directly depend on the question, and the parent table enables navigation from each expression to a rule containing that expression. Preprocessing thus can also construct a QR table representing a many-to-many relationship between questions Q and the output rules R. The QR table and relationship is basically a decomposition of output rules R that links each rule r to the questions q ... $q_n$ that provide answers used in evaluating the condition that triggers the output rule.

Process 500 uses four states {'asleep', 'active', 'disabled', 'answered'} for each question q in the set Q of questions. In step 515, process 500 sets an initial or starter set of questions to 'active' and sets all other questions to 'asleep.' The initial set of active questions is generally selected by the author of the questionnaire and would normally include questions that need to be answered for any context. Further, all questions Q can be organized into sections, and the sections can be assigned an order according the authors preference for the order in which active questions are presented. Step 520 presents questions from a list or stack of active questions. As described above, one, some, or all of the active questions can be presented at the same time in step 520.

The advisor system in step 525 receives from the user an answer a to a question q. The status of the answered question is changed from 'active' to 'answered.'

Step 530 then uses the QE table to identify any expressions that directly depend on the answer to question q. Expressions that depend on the answer to the question but are false can be disabled in step 535. In particular, if an expression is a simple check on the value of the variable, the expression is marked as disabled if this check evaluates to false. Step 535 further evaluates parent expressions that are linked through the parent table to the expressions found in step 530 and just disabled in step 535. In particular, if a parent expression is an AND (conjunction) of subexpressions, step 535 disables the expression if at least one of the conjuncts is disabled. If a parent expression is an OR (disjunction) of subexpressions, the expression is disabled if all of the disjuncts are disabled. Such evaluations can be easily extended to any logical operators linking subexpressions. For each expression found in step 530, traversing the parent table in step 535 continues until an expression is reached that has been disabled, that cannot be evaluated based on the current set of answers, or that is a root condition. This updating step 535 is local and takes a processing time linearly related to the number of expressions. When a root condition is reached, the condition is evaluated and will be disabled if false. When an expression corresponding to a condition of an output rule is found to be false (disabled), the output rule is disabled in step 535. Step 540 checks the QR table and disables any questions that are only linked to disabled output rules.

Step 550 evaluates whether the answer a just given triggers any questionnaire rules. If so, additional questions have their status changed to active in step 555. Again the set of active questions to be asked may be organized according to section (i.e., according to the order defined by the questionnaire author), and process 500 branches back to step 520 to present one, some, or all of the active questions to the user. As questions are answered in repetitions of step 525, the status of those questions change from active to answered, and the values of intermediate variables are set. The setting of intermediate variables can trigger questionnaire rules causing the activation and presentation of yet more questions in step 550. When the current answer a does not trigger a questionnaire rule, process 500 branches from step 550 to step 560 to determine whether any questions are still active. If so, process 500 again branches back to step 520, where the advisor system presents active questions to the user.

The list or stack of active questions will be empty once all the previously active questions have been answered and the answers do not trigger questionnaire rules that activate further questions. At this point, when the questionnaire rules do not identify any further questions to be activated and asked, process 500 is able to determine whether the set of answers is complete for evaluation of all of the output rules. (A set of answers may not be complete, for example, if the author of the questionnaire rules made an error.) To check for completeness, process 500 branches from step 560 to step 570 to determine whether any questions are still 'asleep.' If any questions are 'asleep' at step 570, some or all of the questions that are asleep can be activated in step 575. For example, the first section (according to the order created by the questionnaire author) with a question in the 'asleep' state can be identified, and a question that is in that section and 'asleep' can be changed to 'active' in step 575. Process 500 then branches to step 520 to ask the user the newly activated questions in an order that was influenced at least by the author's ordering of the sections of questions to be presented.

Process 600 is done when all of the questions are either answered or disabled in step 570. The answers to the questionnaire required for evaluation of the output rules are guaranteed to be available at this point. More specifically, the only questions that have not been asked and answered are the disabled questions, and the disabled questions only provide information relating to output rules that evaluations in step 535 have already ruled out as being applicable for output of advice.

Process 500 and system 100 as described above can combine the advantages of a human generated questionnaire (e.g., most questions being presented in an intuitive or "natural" order authored using questionnaire rules) with completeness automatically ensured.

One important property of advisor system is monotonicity, i.e., once an intermediate variable has been asserted or a question has been triggered to be shown to the user, the intermediate variable or question will not be retracted later unless the refraction is done in a specifically controlled and allowed fashion. The case were a user makes a change to his previous answers is described below. It can be proven that this monotonicity avoids circularity, so that the case in which the same variables may be added, later retracted, and then added again possibly leading to an infinite loop cannot occur. When the user adds a new input/answer, additional questions may be presented, but questions are not deleted as a result of an answer. (As used here, a question which has been answered remains part of the questionnaire even though the question may not be currently presented to the user.) Thus, a questionnaire converges through addition of questions towards a fixed end point, i.e., a final set of questions presented for which through running the rule engine, no further questions need to be shown. It can also be proven that for each context, the questionnaire converges on a corresponding fixed point regardless of the order in which the questions were presented. Questionnaire generation terminates when the fixed point is reached.

Monotonicity also guarantees that the questions shown to the user do not depend on the order in which questions are asked. In particular, the actual list of questions in a questionnaire is completely determined by the question-answer pairs, so that the system of questionnaire generation is deterministic. The actual questions that a user will be asked are fully determined by his "situation", i.e., the question answers, and not by any other possibly random influences, such as the order in which the user fills out the questionnaire. This well-defined deterministic behavior is highly desirable in compliance scenarios.

One issue that may occur is re-editing, i.e., how a questionnaire can be reconstructed if the user edits an answer. The problem is that if a user changes a question's answer, the follow up structure in the questionnaire may be changed. There are various different approaches. One approach is to reevaluate an intermediate variables and conditions to reconstruct the list or lists of identified questions to be presented up to and including the changed answer. Answers that came after the input changed can be discarded and intermediate variables that depend on the discarded answers are set back to an undefined state. Alternatively, a more computationally efficient approach would be to reevaluate all intermediate variables and conditions without answers that came after the changed answer and then reuse the previous answers that were given by the user and still fit within the newly generated questionnaire structure. This can be done by recording answers provided after the change point, regenerating the questionnaire up to and including the changed answer by running the rules engine with a subset of the answers, and then repopulating the new questionnaire with the subset of recorded answers previously given. The rules engine can be run again or iteratively at that point. Of course, if a user changes an answer in a completed questionnaire, it may not be possible to generate the entire questionnaire after the change because the answers to some of the 'new' questions may not be known. The extra parts however will be filled in as the user then addresses the additional questions which they didn't fill in before. Because of the way the questionnaire is generated, it doesn't matter in which order the questions are filled.

Embodiments of the invention described above can generally be implemented using computers or other computing system containing well known components including but not limited to user interface devices such as monitors and keyboards, processors, memory and other information storage, and interfaces for communications with other computing systems. Other embodiments of the invention can be implemented using a computer readable medium such as a semiconductor memory and disk memory such as CD-ROM or DVD-ROM containing software code or instructions that when executed by a processor or computing system performs that process described herein.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A process for generating a questionnaire, the process comprising:
a computing system presenting to a user a first subset from a set of questions of the questionnaire;
receiving by the computing system first answers that the user provides to the first subset of questions;
evaluating by the computing system of first rules to identify any conditions of the first rules that are needed to determine application of the first rules and that are not given values by the first answers, wherein the first rules have respective conditions for providing respective outputs to the user;
using the conditions identified to select a second subset of the questions, wherein the second subset of questions are selected so that a combination of the first answers and answers to the second questions gives values to a set of the conditions that are sufficient to determine application of the first rules; and
presenting the second subset of questions to the user;
wherein:
the first subset of the questions is presented according to authored structure for the questionnaire; and
the second subset of the questions is presented as a result of a completeness module of the computing system correcting an error or incompleteness in the authored structure.

2. The process of claim 1, wherein presenting the first subset of questions comprises:
setting each of the questions of the questionnaire to a first state or a second state, wherein questions having the first state are active for presentation to the user and questions not having the first state are not presented to the user;

changing a state of a first of the questions from the first state to a third state in response to receiving an answer to the first question; and changing a second question from the second state to the first state in response to an answer to the first question triggering a second rule that indicates a condition for presentation of the second question to the user.

3. The process of claim 1, wherein the authored structure comprises a set of second rules, the second rules having respective conditions for presentation of one or more of the questions from the questionnaire.

4. The process of claim 3, wherein the authored structure further comprises a partition of the question into a plurality of sections and an ordering of the sections, wherein the completeness module uses the ordering of sections in presentation of the second subset of the questions.

5. A non-transitory computer readable media storing instructions that when executed by the computer system cause the computing system to perform the process of claim 1.

6. The process of claim 1, further comprising setting values of intermediate variables in the computing system according to the first answers and second rules for setting the values for the intermediate variables; wherein the conditions of the first rules depend on the intermediate variables.

7. The process of claim 1, further comprising constructing a table linking each question to each of the first rules that have conditions that depend on the question, wherein selecting the second subset of the questions comprises identifying questions linked in the table to the first rules that have conditions not given values by the first answers.

8. A process for generating a questionnaire, the process comprising:

a computing system presenting to a user a first subset from a set of questions of the questionnaire and receiving first answers that the user provides to the first subset of questions, wherein presenting the first subset of questions comprises:

setting each of the questions of the questionnaire to a first state or a second state, wherein questions having the first state are active for presentation to the user and questions not having the first state are not presented to the user;

changing a state of a first of the questions from the first state to a third state in response to receiving an answer to the first question; and changing a second question from the second state to the first state in response to an answer to the first question triggering a second rule that indicates a condition for presentation of the second question to the user;

evaluating by the computing system of the first answers to determine whether the first answers are sufficient to give definite values to respective conditions of first rules, wherein the first rules have respective conditions for providing respective output to the user;

disabling each of the first rules that is such that an answer from the user indicates that a condition of the disabled first rule cannot be satisfied;

identifying all of the first rules that are linked to a third question in that the conditions of the linked first rules depend on an answer to the third question;

changing the third question from the second state to a fourth state in response to all of the linked first rules being disabled, wherein questions in the fourth state are disabled from being presented to the user;

using the conditions of the first rules to identify a second subset of the questions, wherein the second subset of questions has second answers such that a combination of the first answers and the second answers is sufficient to give definite values to the respective conditions of the first rules; and presenting the second subset of questions to the user.

9. The process of claim 8, wherein identifying the second set of questions comprises determining that the questions are such that none of the questions are in the first state and one or more of the questions are in the second state, and then changing a question from the second state to the first state.

10. The process of claim 8, further comprising determining that the question presentation is complete in response to determining that none of the questions are in the first state or second state.

11. The process of claim 8, further comprising constructing a table linking each question to each of the first rules that have conditions that depend on the question, wherein identifying the first rules that are linked to the third question includes using the table.

12. An advisor system comprising:

data storage storing first rules and an authored structure, wherein each of the first rules identifies an output to be provided in response to a condition of the first rule being satisfied, the conditions of the first rules depending on answers given by a user in response to questions; and a processor arranged to execute a questionnaire generator and a completeness module, wherein the questionnaire generator presents a first set of questions to a user according to the authored structure, and the completeness module corrects an error or incompleteness in the authored structure by using the first rules to identify a second set of questions that were not presented according to the authored structure and that need to be answered in order to determine values for the conditions of the first rules.

13. The advisor system of claim 12, wherein the authored structure comprises second rules, wherein each of the second rules identifies one or more questions to be presented in response to a condition of the second rule being satisfied, and the questionnaire generator uses the second rules to identify the questions in the first set.

14. The advisor system of claim 13, wherein the authored structure comprises a partition of the questions of the questionnaire into an ordered series of sections, and the completeness module presents the second set of questions in an order that depends on the ordered series.

15. The advisor system of claim 12, wherein the completeness module is to identify any conditions of first rules that are needed to determine application of the first rules and are not given values by the answers to the questions presented according to the authored structure and to select the second set of questions according to the conditions identified.

* * * * *